(12) United States Patent
Nguyen et al.

(10) Patent No.: US 6,539,439 B1
(45) Date of Patent: Mar. 25, 2003

(54) METHOD AND APPARATUS FOR INTERFACING A BUS AT AN INDEPENDENT RATE WITH INPUT/OUTPUT DEVICES

(75) Inventors: Ngyuyen Q. Nguyen, San Jose, CA (US); Ali Alasti, Los Altos, CA (US); Govind Malalur, Fremont, CA (US)

(73) Assignee: Ati International Srl, Barbados (KN)

( * ) Notice: Subject to any disclaimer, the term of this patent is extended or adjusted under 35 U.S.C. 154(b) by 0 days.

(21) Appl. No.: 09/376,874

(22) Filed: Aug. 18, 1999

(51) Int. Cl.$^7$ .................................. G06F 3/00
(52) U.S. Cl. .................. 710/52; 710/57; 710/100; 710/129
(58) Field of Search ................. 710/52, 57, 100, 710/129

(56) References Cited

U.S. PATENT DOCUMENTS 5,379,380 A * 1/1995 Mori et al. .................. 386/104
5,577,213 A * 11/1996 Avery et al. ................ 709/234

* cited by examiner

Primary Examiner—Jeffrey Gaffin
Assistant Examiner—Harold Kim

(74) Attorney, Agent, or Firm—Vedder, Price, Kaufman & Kammholz (57) ABSTRACT

A method and apparatus for interfacing a bus with a plurality of input/output (I/O) devices includes steps for handling transactions to and from the I/O devices. Transactions from the I/O devices includes processing that begins by receiving the transactions, where each transaction is received at a rate corresponding to the providing I/O device. The processing continues by identifying, for each transaction, a corresponding section of memory for temporarily storing the transaction. The particular section of memory is identified based on the type of transaction and/or the identity of the I/O device. The processing then continues by storing each transaction in the identified section of memory when the section has an available entry. When the bus is available and a transaction has been selected, the selected transaction is provided to the bus at the rate of the bus. Processing of transactions directed towards the I/O devices includes steps for monitoring the bus during non-I/O bus intervals for transactions relating to one of the I/O devices. When a transaction is directed towards an I/O device, the transaction is interpreted to identify the particular I/O controller that supports the particular I/O device. The processing then continues by storing, at the bus rate, the transaction in the section of memory corresponding with the I/O device. Once stored in memory, the transaction is provided to an associated I/O controller, which processes the transaction at the rate of the corresponding I/O device.

33 Claims, 9 Drawing Sheets

METHOD AND APPARATUS FOR INTERFACING A BUS AT AN INDEPENDENT RATE WITH INPUT/OUTPUT DEVICES

TECHNICAL FIELD OF THE INVENTION

This invention relates generally to computer architectures and more particularly to coupling input/output (I/O) devices with processing units and memory of a computing system.

BACKGROUND OF THE INVENTION

Figure 1:
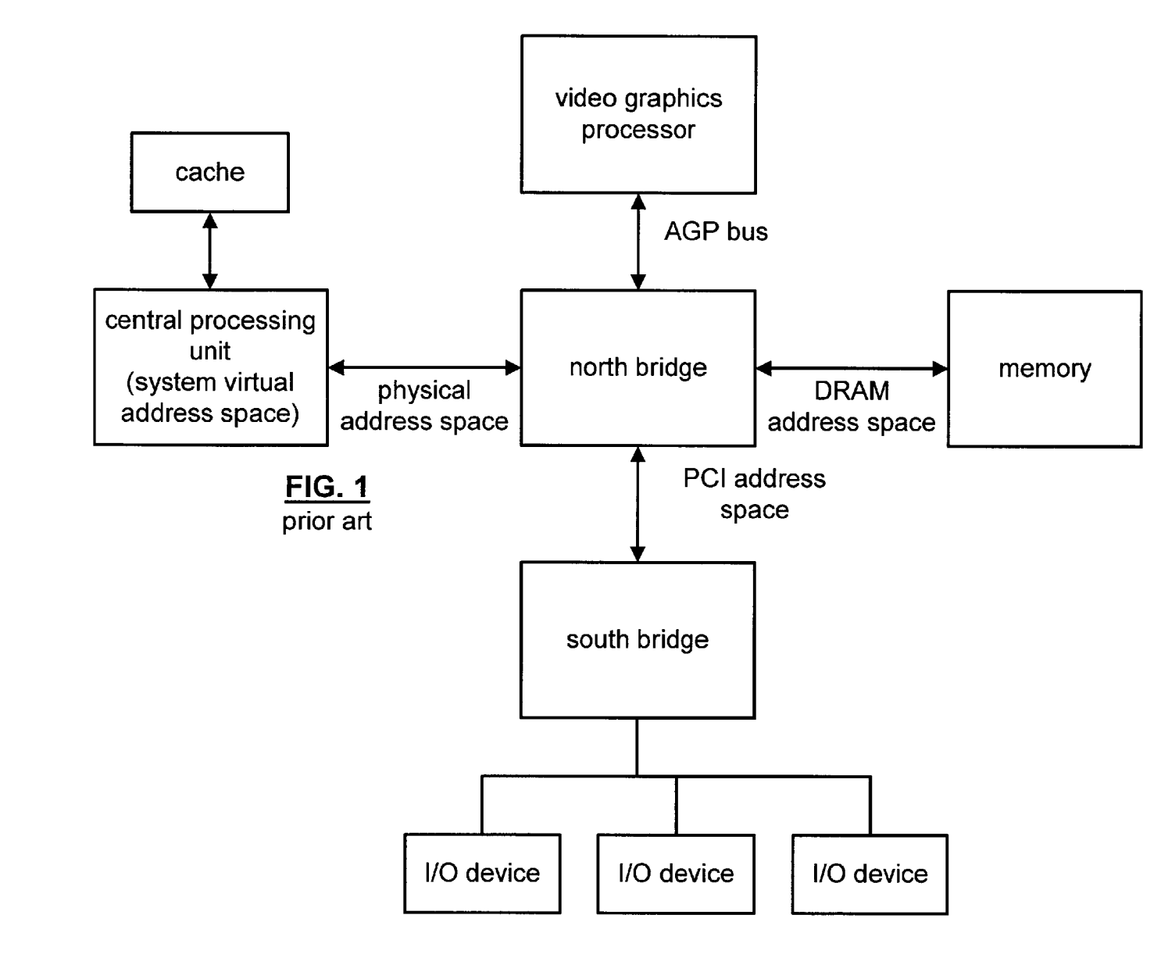
FIG. 1 illustrates a schematic block diagram of a prior art computing system.

FIG. 1 illustrates a schematic block diagram of a computer system. As shown, the computer system includes a central processing unit (CPU) operably coupled to local cache and to a north bridge. The central processing unit when executing a memory transaction (e.g., a read from memory command, a write to memory command, or a read/write command) internally processes addresses associated with the transaction in a virtual, or linear, address space. To communicate with the north bridge, the central processing unit converts the virtual addresses into physical addresses. The north bridge, upon receiving the physical addresses determines whether the transaction is addressing a location within the accelerated graphics port (AGP) address space, the DRAM address space, or the PCI address space.

If the received physical address corresponds to the AGP address space, the north bridge further translates the physical address, using a GART table, into a corresponding physical address. Having obtained the physical address, the north bridge communicates with the memory to retrieve the appropriate memory block (e.g., line of memory, or multiple lines of memory where a line is 32 bits, 64 bits, 128 bits, etc.). If the physical address corresponds to the memory, the north bridge utilizes the physical address to facilitate the memory transaction. As such, if the memory transaction was a read transaction, the north bridge facilitates the retrieval of the corresponding memory line or lines from memory and provides them to the central processing unit. If the received physical address corresponds with the PCI address space, the north bridge passes the transaction to the south bridge.

The south bridge, upon receiving a physical address, determines which of the plurality of I/O devices is to receive the transaction. To facilitate the forwarding of transactions to the I/O devices, the south bridge includes a plurality of memories, one for each I/O device coupled thereto, for queuing transactions to and from the corresponding I/O device. If an I/O device has a transaction queued, the south bridge, in a Round Robin manner, divides the PCI bus for transporting the queued transaction to the corresponding I/O device. As such, each I/O device has separate memory and therefore does not provide a dynamic interface.

In addition to the north bridge receiving transactions from the central processing unit, it may also receive transactions from the video graphics processor and the south bridge relaying transactions from I/O devices. Such transactions have varying requirements. For example, transactions from the central processing unit and video graphics processor are typically high speed transactions which require low latency. The amount of data in such transactions may vary but is generally a memory line or plurality of memory lines per transaction. The transactions from the I/O devices are generally large amounts of data (i.e., significantly more than several memory lines of data), but are typically latency tolerant.

In the system of FIG. 1, memory transactions are required to be synchronous with the processing speed of the memory. As such, the speed of transactions is restricted to the speed of memory. As is known in the art, improvements within the processing rate of the processing unit and the access rate of memory are increasing at different rates. Currently, the processors have a higher processing rate than the memory access rate of current memory devices. As such, the processing unit is not functioning at an optimal rate when performing memory transactions.

The video graphics processor provides display data to a display (not shown). Typically, the video graphics processor will include a frame buffer for storing at least part of a screen of data. To minimize the size of the frame buffer or to extend the memory used for generating the display data, the video graphics processor often uses the AGP memory space. In this instance, the video graphics processor is writing to and reading from the memory via the AGP bus and the north bridge. The processing of video graphics data requires a high speed low-latency transmission path. Since the video graphics processor is a separate integrated circuit from the north bridge, it experiences the same limitations as the central processing unit to north bridge interface.

In the system of FIG. 1, the central processing unit, the north bridge, the video graphics processor, the south bridge, are fabricated as separate integrated circuits. As such, the transmission path from the central processing unit through the north bridge to the memory is of a relatively significant length, in comparison to buses within the integrated circuits. As is known in the art, the length of a physical path impacts the speed at which data may be transmitted. Such restrictions arise due to the inductance and capacitance of such transmission paths. In short, the relatively substantial lengths of these paths limit the bandwidth capabilities and speed capabilities of processing transactions.

Therefore, a need exists for a method and apparatus that improves transaction processing by providing a module asynchronous display and device interface.

DETAILED DESCRIPTION OF A PREFERRED EMBODIMENT

Generally, the present invention provides a method and apparatus for interfacing a bus with a plurality of input/ output (I/O) devices. The interface processing includes steps for handling transactions to and from the I/O devices. Transactions from the I/O devices includes processing that begins by receiving the transactions, where each transaction is received at a rate corresponding to the providing I/O device. For example, an audio device provides data in 8 bit, 16 bit, or 32 bit words at a rate of 44.1 kilohertz, while a display controller provides 32 bit words at a rate of several hundred megabytes per second. The processing continues by identifying, for each transaction, a corresponding section of memory for temporarily storing the transaction. The particular section of memory is identified based on the type of transaction and/or the identity of the I/O device. For example, transactions relating to display data are stored in one section of the memory, while transactions for audio are stored in a separate section of memory. The processing then continues by storing each transaction in the identified section of memory when the section has an available entry. Having stored the transaction, the processing then determines when the bus will next be available and also determines which stored transaction will be placed on the bus. When the bus is available and a transaction has been selected, the selected transaction is provided to the bus at the rate of the bus. For example, in one embodiment of a computer system in accordance with the present invention, the bus will have a data bandwidth of 256 bits and a processing rate of 500 megahertz.

For transactions directed towards the I/O devices, the present invention includes processing steps for monitoring the bus during non-I/O bus intervals for transactions relating to one of the I/O devices. When a transaction is directed towards an I/O device, the transaction is interpreted to identify the particular I/O controller that supports the particular I/O device. The processing then continues by storing, at the bus rate, the transaction in the section of memory corresponding with the I/O device. Once stored in memory, the transaction is provided to an associated I/O controller, which processes the transaction at the rate of the corresponding I/O device. With such a method and apparatus, I/O device interfacing may be done in a dynamic manner with reduced lengths of transport paths and in an asynchronous manner with the memory. In other words, the I/O gateway processing of the present invention decouples the I/O devices from the memory in such a way that the I/O devices are enabled to function at their own rate without dependency on the rate of memory.

Figure 2:
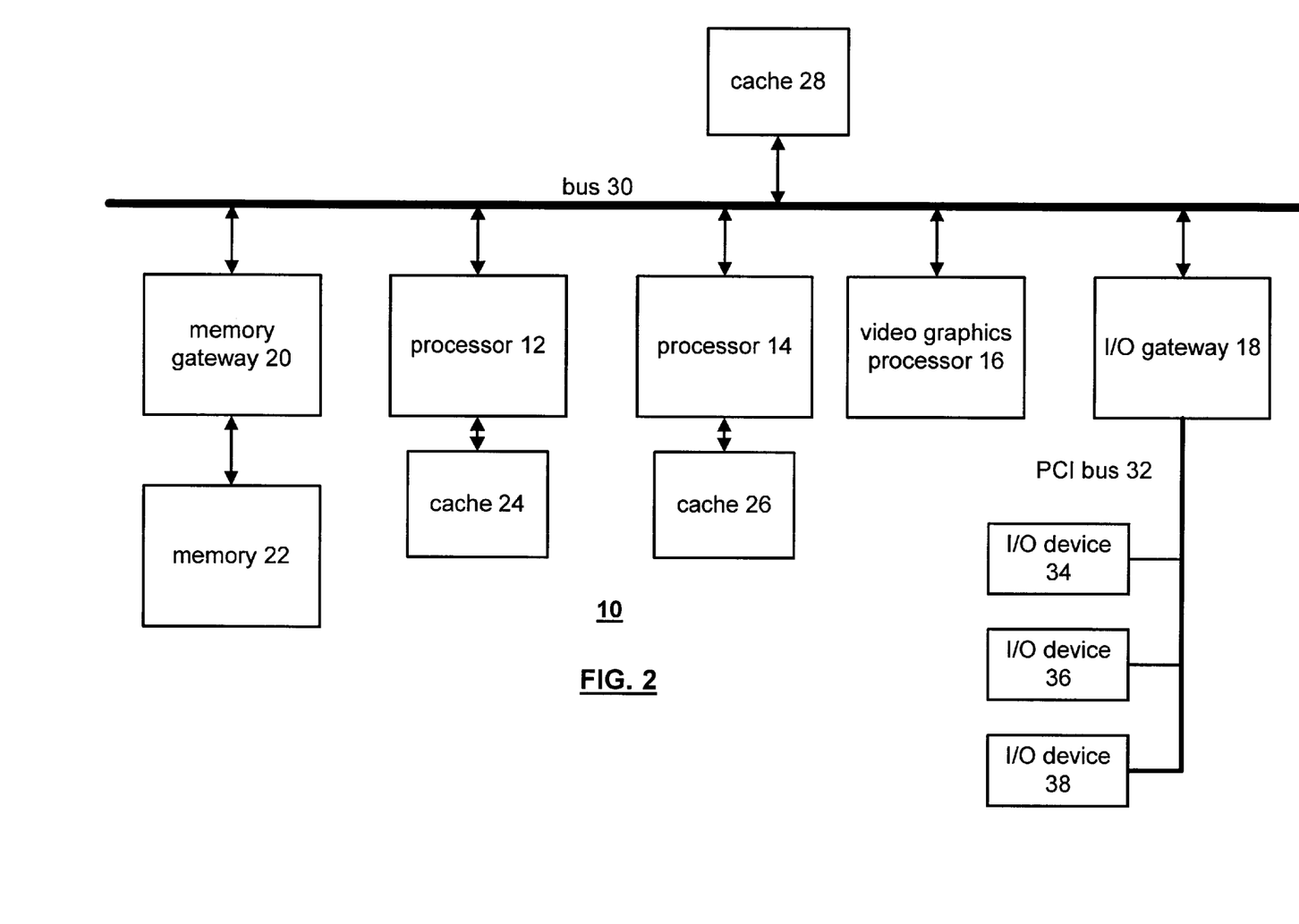
FIG. 2 illustrates a graphical representation of a computing system that includes the I/O device interface in accordance with the present invention.

The present invention can be more fully described with reference to FIGS. 2 through 9. FIG. 2 illustrates a schematic block diagram of a computing system 10 that includes a plurality of processors 12 and 14, a video graphics processor 16, an I/O gateway 18, a memory gateway 20, a bus 30, and cache memory 28. The memory gateway 20 is operably coupled to a memory 22 and the I/O gateway 18 is coupled to a plurality of I/O devices 34–38 via a PCI bus 32. The system 10 is also shown to include cache memory 24 and 26 operably coupled to processors 12 and 14. In various embodiments of system 10, only cache 28 may be included, only cache 24 or 26 may be included, or all caches 24, 26, and 28 may be included. For a more detailed discussion of cache sharing in such a computing system 10 refer to co-pending application entitled "Method and Apparatus for Sharing Cache Memory", a Ser. No. 09/328,844 and a filing date of Jun. 9, 1999.

The computing system 10 may be implemented as an integrated circuit wherein the bus 30 is a low-latency, high bandwidth data bus. In one embodiment, the bus 30 may include a 256 data bit line and operate at 500 mega hertz. For a detailed discussion of functionality of bus 30, refer to co-pending patent application entitled "Method and Apparatus for Busing Data Elements", a Ser. No. 09/328,971 and a filing date of Jun. 9, 1999. In general, the transactions placed on bus 30 utilize the physical address space.

The I/O devices 34–38 may be sound cards, television encoder cards, or circuits, MPEG decoders/encoders (for example, digital satellite transceivers), a display (e.g., an LCD display, CRT monitor), and/or any peripheral computer device that interfaces with the computing system via the PCI bus.

Figure 3:
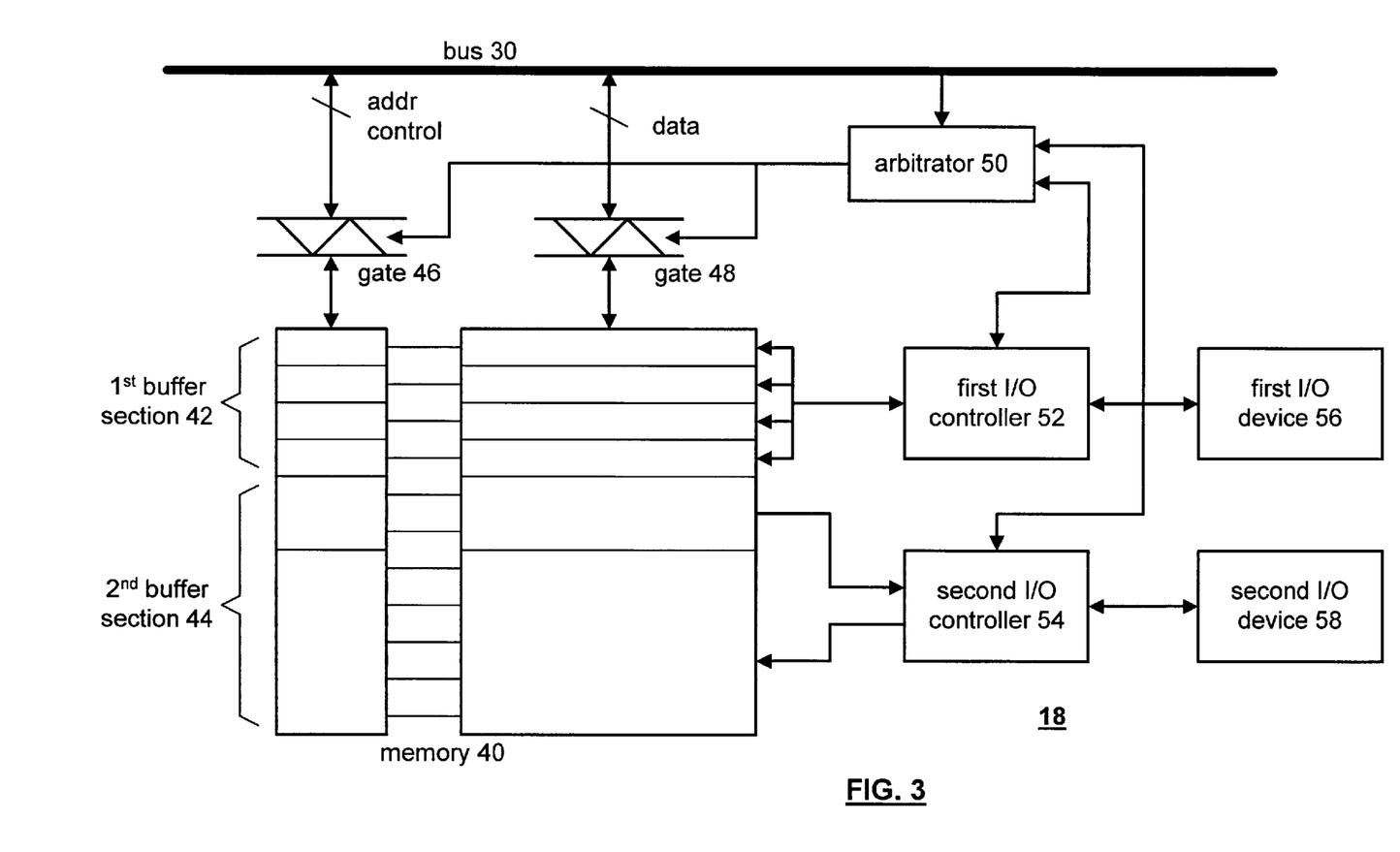
FIG. 3 illustrates a schematic block diagram of the I/O gateway of FIG. 2.

FIG. 3 illustrates a schematic block diagram of the I/O gateway 18. The I/O gateway 18 includes memory 40, an address and control gate 46, a data gate 48, an arbitrator 50, a first I/O controller 52, a second I/O controller 54, a first I/O device 56 and a second I/O device 58. The memory section 40 includes a first buffer section 42 that corresponds with the first I/O controller 52 and a second buffer section 44 that corresponds with the second I/O controller 54. Note that the arbitrator 50, the first I/O controller 52 and the second I/O controller 54 may be implemented as separate processing devices or an integrated processing device. Such a processing device may be a microprocessor, microcontroller, microcomputer, digital signal processor, state machine, logic circuitry and/or any device that manipulates information (analog and/or digital signals) based on operational instructions. Such corresponding operational instructions may be stored in memory 40 or a separate memory (not shown). The memory may be RAM, ROM, system memory, floppy disk memory, hard drive memory, and/or any device that stores digital information in a retrievable manner. Note that when the processing device implements one or more of the functions of the arbitrator 50, the first I/O controller 52 and/or the second I/O controller 54 utilizing a state machine or logic circuitry, the memory storing the corresponding operational instructions is embedded within the circuitry comprising the state machine and/or logic circuitry.

For transactions initiated by an I/O device 56 or 58, the corresponding I/O controller 52 or 54 receives the transactions and stores them in a memory location within the corresponding buffer section 42 or 44. The I/O controller 52 or 54 does this at the rate of the I/O device 56 or 58. As such, if the I/O device operates at 44.1 kilohertz and transports 8 bit data words, the I/O controller store the 8 bit words in the corresponding entry within the buffer section. Note that the width of the memory 40 is the same as the width of the bus 30. For example, if the bus has a 256 bit bandwidth, the data section of memory will be 256 bits. As such, the I/O controller 52 or 54 will store the words received from the I/O devices in a line of memory 40 until the line is full. Once the line is full, the I/O controller 52 or 54 informs the arbitrator 50 that it has a line ready for transporting on the bus 30. The arbitrator 50, utilizing a priority scheme, which will be discussed in greater detail with reference to FIG. 5, enables gates 46 and 48, such that a corresponding line of memory 40 is placed on bus 30 during a bus access interval at the rate of the bus 30, wherein the bus access interval may be a single clock cycle or multiple clock cycles and may vary from interval to interval.

The arbitrator 50 also monitors the bus 30 for transactions that target an I/O device 56 or 58. When the arbitrator 50 identifies such a transaction, it informs the corresponding I/O controller 52 or 54 and enables gates 46 and 48 to store the corresponding transaction in an identified location of the appropriate memory section. Once the transaction is stored in the memory, which is done at the bus rate, for example, 256 bit data words at 500 mega hertz, the I/O controller 52 or 54 retrieves the data from memory and provides it to the I/O devices 56 or 58 at the rate of the I/O device. By utilizing a single memory 40, the number of lines allocated to a particular I/O device and corresponding I/O controller may be reallocated. For example, if the second I/O device 58 is a display, and the resolution has changed or the refresh rate has changed, which requires substantially more data to be processed, the second buffer section may be increased in size by taking memory locations away from the first buffer section. In addition, I/O devices may be added or deleted from the computing system without affecting operation of the other sections of the computing system. The only device that is impacted is the corresponding I/O controller that provides the interfacing for such an I/O device. As such, a more dynamic and efficient I/O device interfacing within a computer system is provided.

Figure 4:
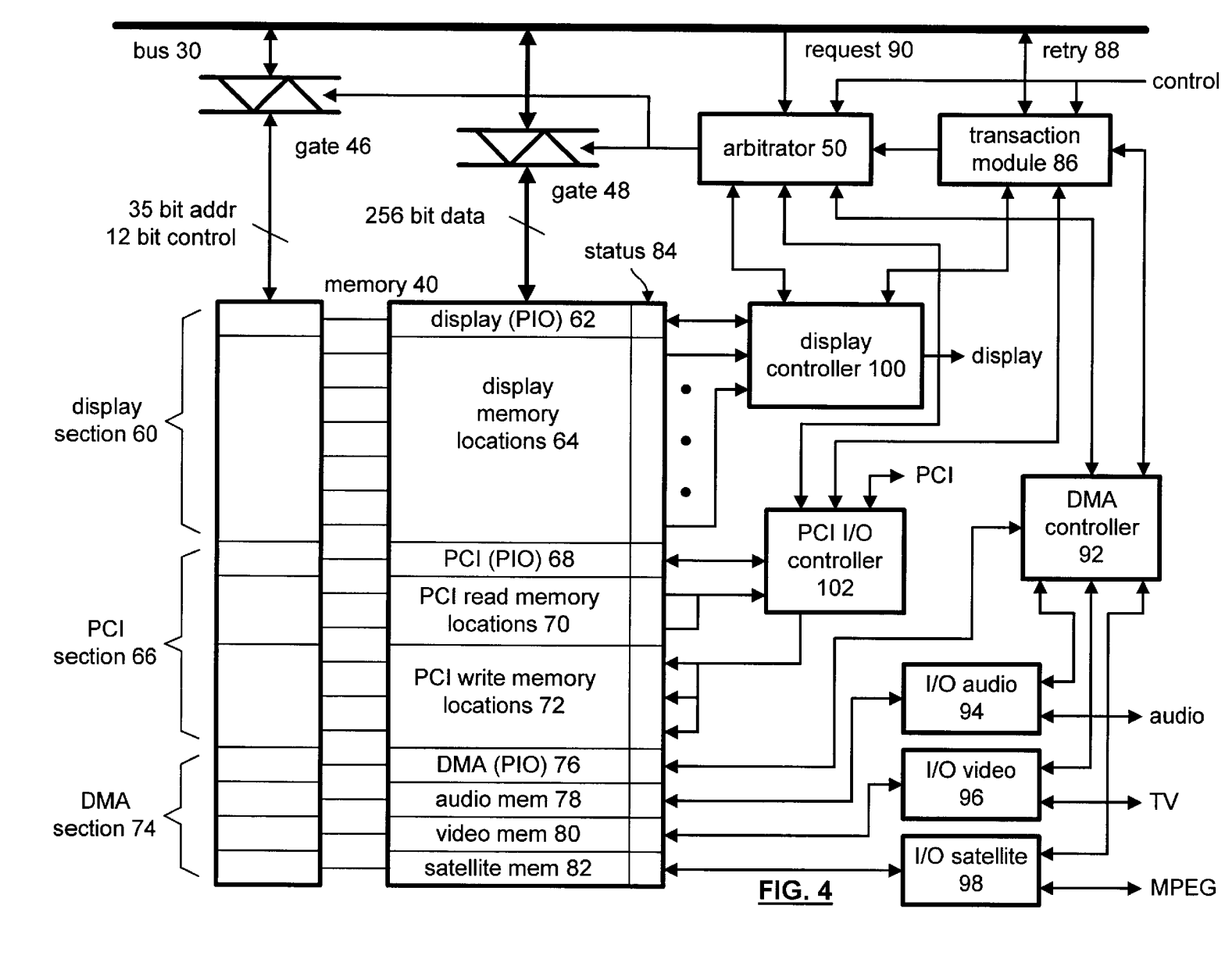
FIG. 4 illustrates an alternate schematic block diagram of the I/O gateway of FIG. 2.

FIG. 4 illustrates an alternate schematic block diagram of the I/O gateway 18.

The I/O gateway 18 includes the memory 40, an address/control gate 46, a data gate 48, the arbitrator 50, a transaction module 86, a display controller 100, a PCI I/O controller 102, a DMA controller 92, an I/O audio controller 94, an I/O video controller 96, and an I/O satellite controller 98. The memory is divided into three sections, a display section 60, a PCI section 66, and a DMA section 74. The display section 60 includes a plurality of display memory locations and a display programmed input/output (PIO) section 62. The PCI memory section 66 includes a plurality of PCI read memory locations 70, a plurality of PCI write memory locations 72, and a PCI PIO section 68. The DMA section 74 includes an audio memory section 78, a video memory section 80, a satellite memory section 82, and a DMA PI/O memory section 76.

Each of the memory locations in memory 40 includes a status field that indicates the current status for its corresponding memory location. The status may be that data is being filled (i.e., written from one of the I/O display controllers 100, 102, 94, 96, 98), the memory location is full (i.e., indicating that data is ready for transporting onto the bus 30), or the memory location is available. The memory location becomes available once the data has been transported onto the bus 30 (and a retry message was not received) or has been fully provided to the corresponding I/O controller.

In general, the I/O gateway 18 processes device transactions, control transactions and component transactions. A device transaction is one in which the I/O device initiates the transaction where such a transaction may be a read and/or write memory access transaction. In such transactions, the I/O device will generate the appropriate address and indicate whether the transaction is a read and/or write by providing the appropriate control signals. If the transaction is a write transaction, the I/O device will also provide the data. Control transactions are generally initiated by a processing device and instructs a particular I/O device to change its processing of transactions. For example, the processing unit 12, 14 or 16 may provide an indication that the audio I/O device is to commence playing a certain stored digital audio file. Typically, the control transactions are processed through the display PIO 62, the PCI PIO 68, or the DMA PIO 76. Component transactions are originated by a component in the computing system (e.g., the processors 12, 14 or 16). Such component transactions are read and/or write memory transactions. As such, the processing device is dictating to a particular I/O device that is to perform a read and/or write function to memory.

The arbitrator 50 monitors transactions on the bus 30, which are originated from other components in the computing system, where the transactions identify a particular I/O device. The arbitrator 50 also monitors the display controller 100, PCI I/O controller 102 and DMA controller 92 for transactions that are ready for transporting on the bus 30. In addition, the arbitrator 50 receives information from the transaction module 86, where the information indicates that a transaction has received a retry message. As an example of monitoring the bus 30, when the arbitrator 50 receives a request 90, which identifies a particular I/O device (e.g., a display, a PCI device, an audio device, a television output signal, or an EMPEG output signal), the arbitrator 50 enables gates 46 and 48 to store the incoming transaction in memory location in the corresponding section of the I/O device. For example, transactions destined for the display are stored in the display section, transactions for the PCI I/O devices are stored in the PCI section 66 and transactions for the audio, video, or satellite devices are stored in the DMA section 74.

As an example of the arbitrator 50 monitoring the controllers 92, 100, and 102, the arbitrator receives an indication from one of the controllers 100, 102 or 92 that a memory location in its section has data available for transporting on to bus 30. Based on a priority scheme, which will be discussed with reference to FIG. 5, the arbitrator 50, when the bus 30 is available, enables gate 46 and 48 to pass a selected transaction on to the bus 30 at the bus rate. Note that the controllers 100, 102 and 92 determine which memory locations of their sections have data that is to be provided to or retrieved from the bus 30. As such, each controller arbitrates which of its I/O devices will have access to the bus when the controller has access to the bus.

The transaction module 86 monitors for successful completion of the transaction. For example, when a controller 100, 102 or 92 indicates that for an incoming component transaction (i.e., a read and/or write memory transaction originated by a component of the computing system and not an I/O device) but the corresponding memory section 60, 66 or 74 does not have an available location, the controller informs the transaction module 86 of the lack of availability of a memory location. Upon receiving this information, the transaction module 86 generates a rejection and/or retry message 88, which is placed on the bus 30 during a status interval of the pipelined process for the present transaction. When the corresponding component receives the retry or reject message, it may again place the transaction on the bus depending on its particular protocol for handling rejected messages. The processors handle the rejected message as taught in co-pending patent application having a title of METHOD AND APPARATUS FOR SHARING CACHE MEMORY, Ser. No. 09/328,844 and filing date of Jun. 9, 1999.

The transaction module 86 also monitors the bus 30 for rejection of transactions initiated by one of the controllers 100, 102 or 92. If a transaction initiated by an I/O controller 100, 102 or 92 is rejected, the transaction module 86 informs the corresponding controller such that the corresponding memory location is not flagged as available and the transaction is requeued for transmission, or an error is provided to the corresponding I/O device. Note that each of the controllers and the transaction module are programmed in accordance with the pipelined nature of the bus 30. As mentioned in the above-referenced co-pending patent application the bus 30 uses a split transaction pipelined low latency transportation scheme. In such a scheme, each pipeline process begins by arbitrating for access to the bus, the second bus cycle interval has the transaction being placed on the bus, the third bus cycle interval has the components coupled to the bus determining whether it has the data for the particular transaction and/or the transaction should be retried. At the forth bus interval, the component places a retry message on the bus for this particular transaction if the transaction is to be retried. As such, each of the I/O controllers in the I/O gateway 18 realize that after the fourth bus cycle, for a particular transaction, if a retry message has not been received, one will not be received thus the transaction has been successful. At this point, the status 84 may be updated to indicate that the corresponding memory location is available.

The display controller 100 primarily receives component transactions and control transactions, which are originated primarily by the video graphics processor 16. The control transactions, which are processed via the display PIO 62, indicate whether the resolution of the display is to be changed, the refresh rate is to be changed, or any other parameter of the display is to be changed. When such a change is to be made, the display controller 100 makes the corresponding change in providing the data to the display. In operation, display data is placed on the bus 30 and inputted via gates 46 and 48 to locations in the display memory 64. Recall that each transaction downloaded from bus 30 into memory 42 is done at the rate of the bus, which, for example, may be 256 bits at an operating rate of 500 mega hertz. The display controller 100 retrieves the display data (which is typically a 32 bit word) from at least one memory location 64 at a time and provides it to a display. As the data is retrieved from memory location, its corresponding status 84 is updated. For this example, it takes 8 display intervals (i.e., 256/32) to retrieve a full line of display data from the display memory section. Once the full line of data as been retrieved from the memory section, the location is marked as available.

The PCI I/O controller 102 processes device transactions, control transactions and component transactions for PCI I/O devices. The PCI memory section 66 is divided into read memory locations 70 and write memory locations 72. As such, device transactions (i.e., those initiated by a PCI device) and component transactions (i.e., those initiated by a processor) utilize the read and write memory sections to transfer data between PCI devices and memory. The PCI control transactions utilize the PCI PIO memory section 68.

The DMA controller 92 interfaces with the I/O audio controller 94, the I/O video controller 96 and the I/O satellite controller 98. Note that the DMA controller may interface with more or less devices than the three shown. In this embodiment, the I/O audio controller 94 interfaces with a sound card and/or other audio processing device. The I/O video controller 96 interfaces with a television encoder/decoder device such as the one found in the All in Wonder product manufactured and distributed by ATI Technologies. The television encoder/decoder utilizes typical television broadcast signals such as NTSC, PAL, SECAM, etc. signals. The I/O satellite controller 98 interfaces with MPEG encoders and decoders which may be used for HDTV signals, DVD signals, etc. Each of these I/O device controllers 94–98 provides data to and from their corresponding I/O devices. The addresses for addressing memory 40 are originated and controlled by the DMA controller 92. As such, the DMA controller 92 interfaces with the device controllers 94–98 to determine when data is to be provided to or from the corresponding devices. When such data is to be transported, the DMA controller 92 determines which particular memory section within DMA memory section is to be addressed and coordinates with the arbitrator 50 and transaction module 86 to transport data to and from bus 30.

Figure 5:
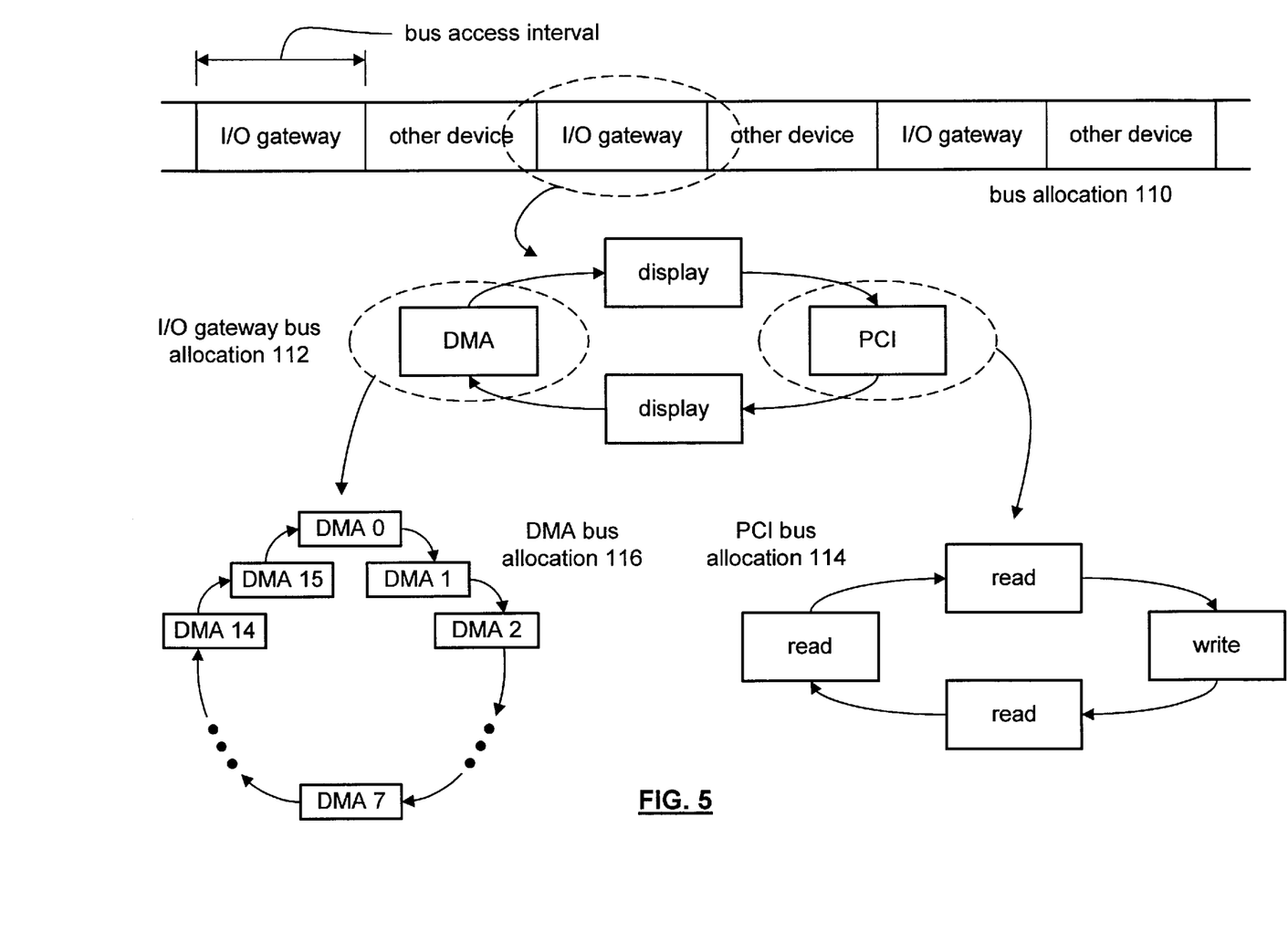
FIG. 5 illustrates a graphical representation of bus arbitration in accordance with the present invention.

FIG. 5 illustrates a diagram indicating the particular bus arbitration priority scheme for the computing system 10. As shown, the bus allocation 110 includes a plurality of bus access intervals. The I/O gateway has control over the bus every other bus access intervals. As such, the I/O gateway has access to download transactions onto the bus every other bus access interval. The other 50% of the bus access intervals are shared between the other devices coupled to the bus 30. The bus access interval that the I/O gateway has access to are arbitrated among the display, the PCI devices, and the DMA devices. Such I/O gateway bus allocation 112 has, for every four accesses to the bus, the display receives two accesses, the PCI devices receiving one access and the DMA receiving one access. This is done in a round robin fashion as shown.

When the PCI controller has access to the bus, which occurs once every 8 bus access intervals, it utilizes a round robin PCI bus allocation 114 process. As such, for each four PCI bus accesses, three read transactions will occur and one write transaction will occur. When the DMA controller has access to the bus, which occurs once every 8 bus access intervals, the DMA controller arbitrates between up to 16 DMA devices. The DMA bus allocation 116 functions in a round robin fashion such that each DMA device has access to the bus one every 1,024 bus access intervals (e.g., ⅛th×¹⁄₁₆th). Note that a DMA device may have multiple slots assigned to it. For example, the audio devices may only receive one DMA slot, while the MPEG DMA device may receive multiple slots.

Alternatively, the I/O gateway bus allocation 112 may have three round robin intervals, two assigned to the display and the other for the DMA and PCI allocations. For the display intervals, multiple displays may have round robin allocation to the bus. For each DMA and PCI allocation interval is allocated in a round robin intervals to a DMA read, a DMA read/write, a DMA read, and a PCI. The PCI interval is then divided in a round robin manner among PCI read and PCI write. As one of average skill in the art will appreciate, the allocation of the I/O allocation of the bus may be done in a variety of ways.

Figure 6:
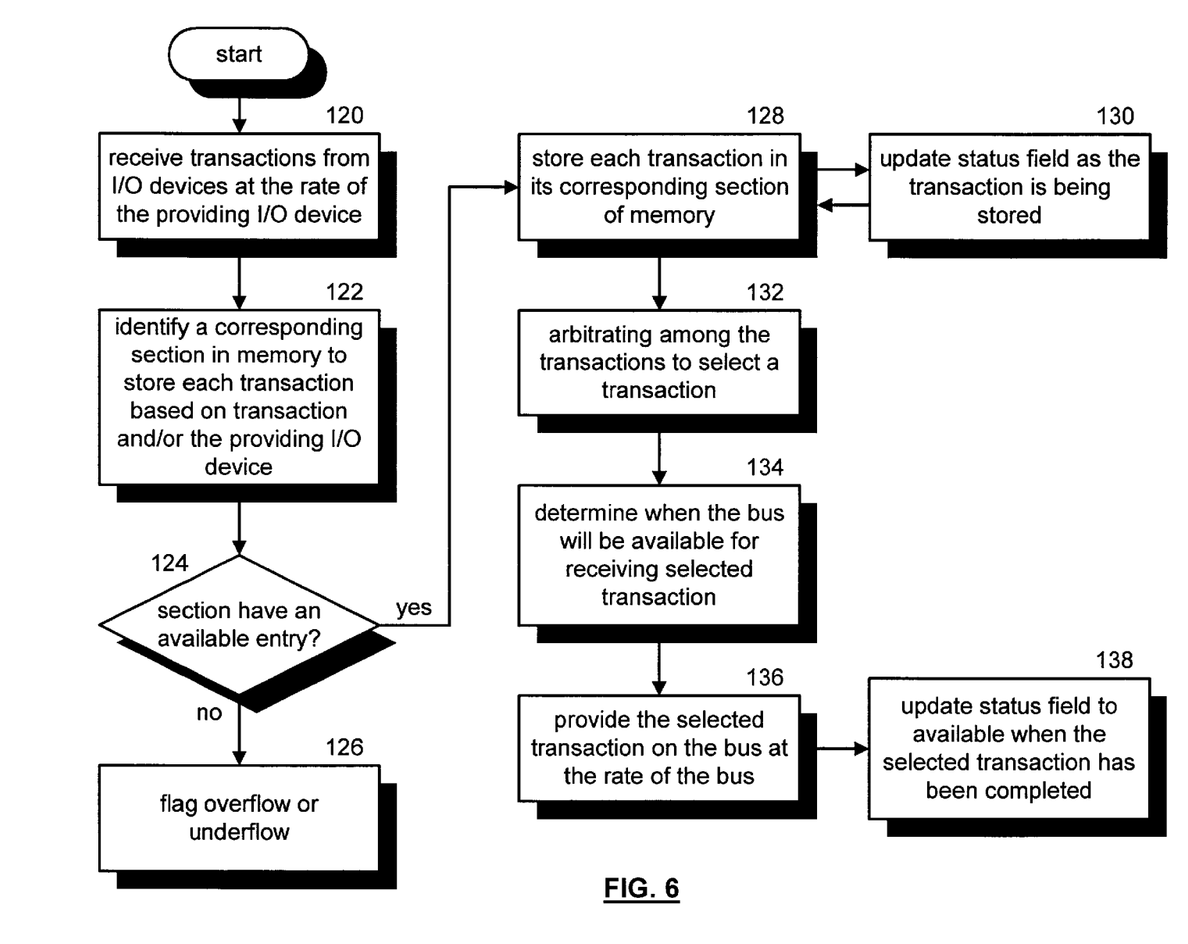
FIG. 6 illustrates a logic diagram of method for interfacing a bus with I/O devices in accordance with the present invention.

FIG. 6 illustrates a logic diagram of a method for interfacing a bus with a plurality of I/O devices. The processing begins at step 120 where transactions are received from I/O devices at the rate of the providing I/O device. For example, a sound card may be processing audio signals at a rate of 44.1 kilohertz. As such, the rate of the providing I/O device is 44.1 kilohertz. In contrast, the display may have a rate that requires several hundred megabytes of data to be transported every second. The process then proceeds to step 122 where a corresponding section in memory is identified to store a transaction based on the type of transaction and/or the identity of the providing I/O device. As discussed with reference to FIG. 4, display transactions are stored in the display section, PCI transactions are stored in the PCI section, and DMA transactions are stored in the DMA section of memory.

The process then proceeds to step 124 where a determination is made as to whether the corresponding section has an available entry. If not, the process proceeds to step 126 where a rejection message is provided to the I/O device and a flag may also be provided indicating an overflow or an underflow of memory. If, however, the section does have an available entry, the process then proceeds to step 128. At step 128 each transaction is stored in its corresponding section of memory at the rate of the I/O device. As the transaction is being stored, the status field of the corresponding memory location is updated. This is shown at step 130.

As previously discussed, if, for example, the audio operates at 44.1 kilohertz and utilizes 8 bit words, and each memory location contains up to 256 bits, 32 data transfers occur between the I/O controller and the memory before a full line of data is obtained.

The process then proceeds to step 132 where arbitration among the transactions that are available for transporting onto the bus is performed to select a particular transaction. The process then proceeds to step 134 where a determination is made as to when the bus will next be available for receiving the selected transaction. The process then proceeds to step 136 where the selected transaction is provided on the bus at the rate of the bus. The process then proceeds to step 138 where the status field is updated to indicate that the memory location storing the selected transaction has become available, which indicates that the selected transaction has been completed and the memory location is available for other transactions.

Figure 7:
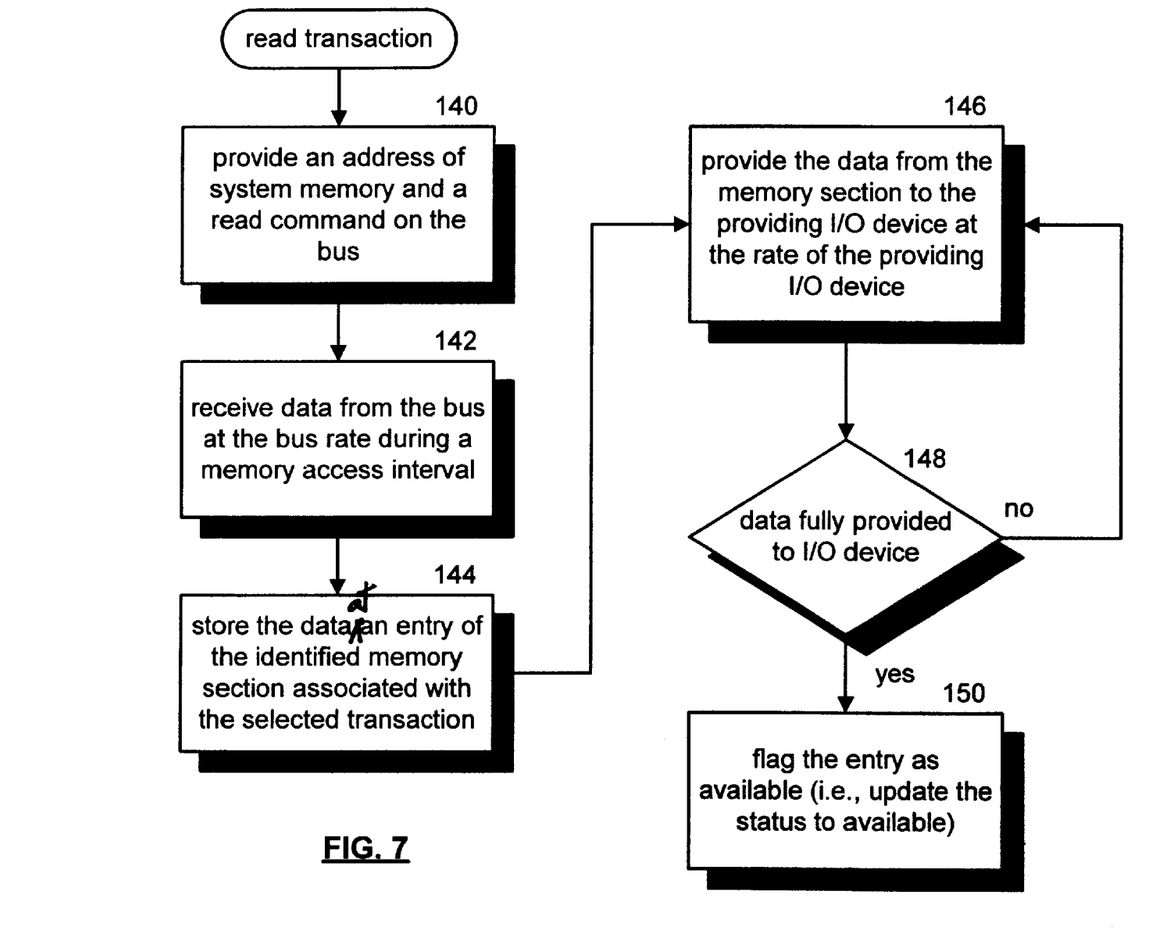
FIG. 7 illustrates a logic diagram of a method in extension of the method of FIG. 6 for processing read transactions.

FIG. 7 illustrates a logic diagram of a method for processing device read transactions (i.e., read transactions initiated by an I/O device) and for processing component read transactions (i.e., read transactions initiated by a component of the system). The processing begins at step 140 where an address of system memory and a read command is provided on the bus. The process then proceeds to step 142 where data is received from the bus at the rate of the bus during a memory access interval. The process then proceeds to step 144 where the data is stored at an entry of the identified memory section associated with the selected transaction. For example, if the transaction corresponds to the reading of data for a display, an entry within the display section of memory is addressed such that the data is written thereto.

The process then proceeds to step 146 where the data is provided from the memory section to the corresponding, or providing I/O device, at the rate of the providing I/O device. The process then proceeds to step 148 where a determination is made as to whether the data has been fully provided to the I/O device. If not, the data is continually provided at the rate of the I/O device until it has been fully provided. Once fully provided, the process proceeds to step 150 where the memory location is flagged as available (i.e., the status field is updated for this particular entry to indicate that it is available).

Figure 8:
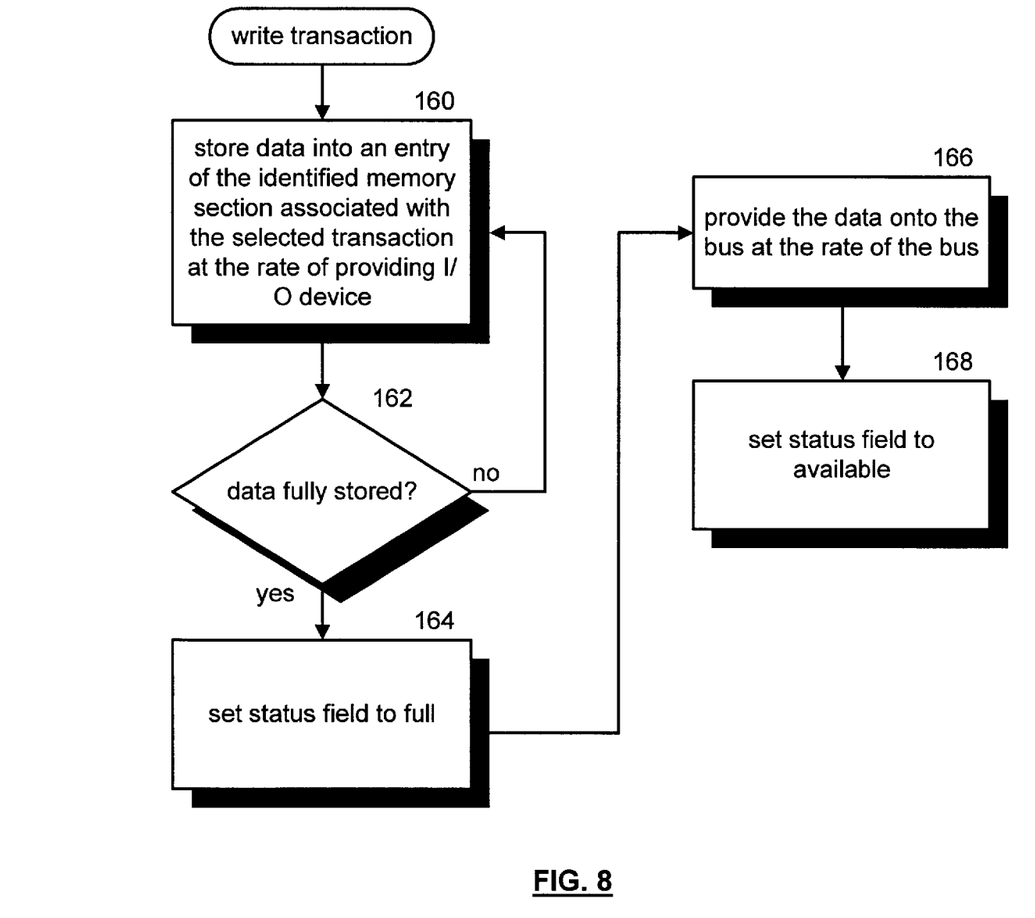
FIG. 8 illustrates a logic diagram of an extended method of the method of FIG. 6 which illustrates the processing of a write transaction.

FIG. 8 illustrates a logic diagram of a write transaction, which may be a device or component write transaction. The process begins at step 160 where data is stored in an entry of an identified memory section (e.g., the display memory section, PCI memory section, or DMA memory section), associated with the selected transaction at the rate of the I/O device. The process then proceeds to step 162 where a determination is made as to whether the data has been fully stored. Such a determination is based on whether a full line of memory has data. As previously mentioned, the I/O devices typically do not process data at the same data width as a line of memory, thus several intervals transpire to write data into the corresponding entry of the memory section.

Once the data has been fully stored, the process proceeds to step 164 where the status field of the corresponding entry is updated to full. The process then proceeds to step 166 where the data is provided onto the bus at the rate of the bus during the appropriate bus access interval. The process then proceeds to step 168 where the status field for the entry is set to available.

Figure 9:
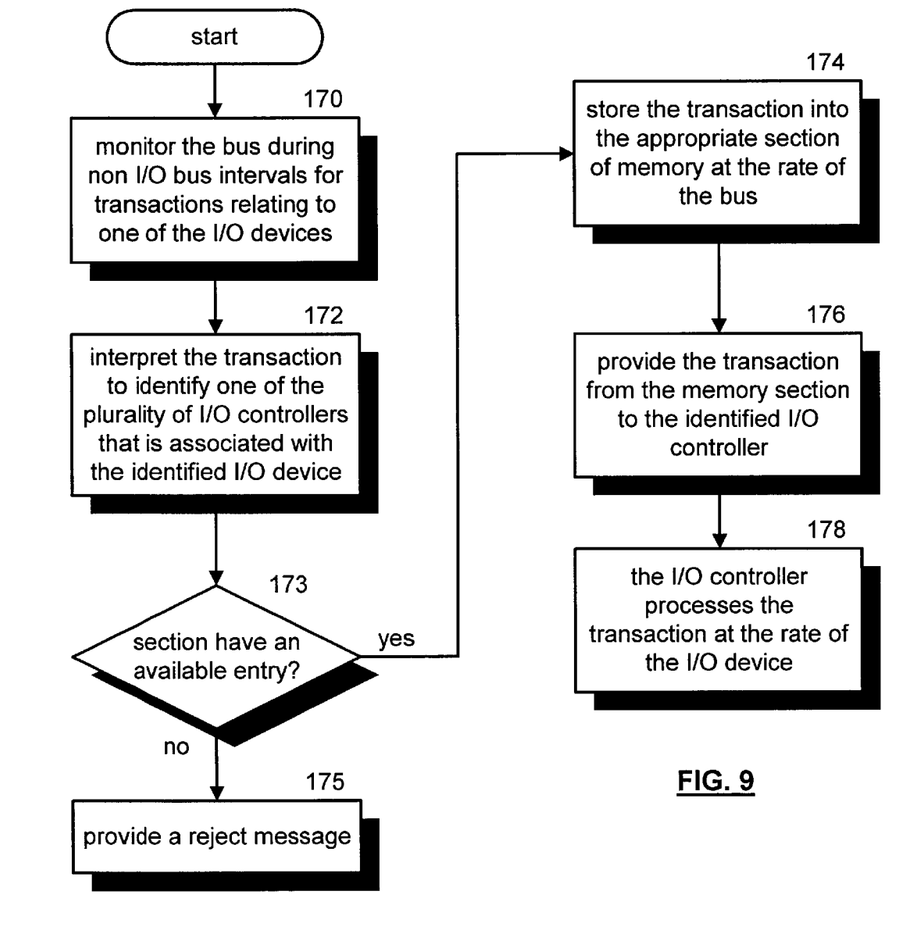
FIG. 9 illustrates a logic diagram of a method for interfacing a bus with I/O devices in accordance with the present invention.

FIG. 9 illustrates a logic diagram of a method for interfacing a bus with input/output devices. The process begins at step 170 where the bus is monitored during non-I/O bus intervals for transactions relating to one of the I/O devices. Such transactions have been referred to as control transactions or component transactions. The process then proceeds to step 172 where the transaction is interpreted to identify one of the plurality of I/O controllers that is associated with the identified I/O device in the transaction. The process then proceeds to step 173 where a determination is made as to whether an entry is available in the corresponding section of memory. If not, the process proceeds to step 175, where a rejection message is provided. If an entry is available, the process proceeds to step 174 where the transaction is stored into the appropriate section of memory at the rate of the bus. The process then proceeds to step 176 where the transaction is provided from the entry of the corresponding memory section to the identified I/O controller at the rate of the corresponding I/O device. The process then proceeds to step 178 where the I/O controller processes the transaction at the rate of the I/O device. Such processing generally entails providing the data to and/or from the corresponding I/O device.

The preceding discussion has presented a method and apparatus for interfacing a plurality of I/O devices with a global bus. By utilizing a centralized memory structure and individual controllers, a dynamic and asynchronous I/O interface is provided between the bus and I/O devices. As such, the I/O devices may operate at their appropriate rate while providing a high speed, high data bandwidth access to and the global bus. As one of average skill in the art would appreciate, other embodiments may be derived from the teachings of the present invention without deviating from the scope of the claims of the spirit of the invention.

What is claimed is:

1. An interface between a bus and a plurality of input/output (I/O) devices, the interface comprises:

memory that includes a plurality of buffer sections;

a gate coupled to the memory and the bus, wherein the gate, when active, operably couples the bus to the memory for transferring information therebetween at a rate of the bus;

a first I/O controller operably coupled to a first buffer section of the plurality of buffer sections, wherein the first I/O controller controls, at a first data rate, first transactions of the information within the first buffer section for a first I/O device;

a second I/O controller operably coupled to a second buffer section of the plurality of buffer sections, wherein the second I/O controller controls, at a second data rate, second transactions of the information within the second buffer section for a second I/O device;

an arbitrator operably coupled to activate the gate to couple at least one line of the first buffer section and the second buffer section to the bus based on priority of at least one of: an ordering of the first and second I/O devices and the information, such that particular information is transferred between the line of the first or second buffer section and the bus; and device transactions, control transactions, and component transactions such that the first transactions are at least one of the device transactions and the control transactions, the second transactions are at least one of the device transactions, the control transactions, and the component transactions such that a component that provides the component transactions is directly coupled to the bus.

2. The interface of claim 1, wherein each of the device transactions and the component transactions further comprises at least one of: an address and a control signal, and for a write device or component transaction further includes data.

3. The interface of claim 1 further comprises a transaction processing module operably coupled to the memory, the arbitrator, and the first and second I/O controllers, wherein the transaction processing module processes the component transactions by:
   determining whether the first or second buffer section is to receive a particular component transaction;
   determining whether the receiving buffer section has capacity to store the particular component transaction; and
   when the receiving buffer section has the capacity, enabling storage of the particular transaction in the receiving buffer section.

4. The interface of claim 3, wherein the transaction processing module issues a retry message on the bus when the receiving buffer section does not have the capacity.

5. The interface of claim 3, wherein the transaction processing module monitors a bus for a retry message regarding a particular device transaction and when the retry message is detected, the transaction processing module notifies the arbitrator to requeue the particular device transaction.

6. The interface of claim 1, wherein the control transaction indicates at least one of:
   a processing change of a device transaction, a processing change of a component transaction, and initiating a particular device transaction.

7. The interface of claim 1, wherein the first buffer section further comprises a plurality of subsections, where a first subsection of the plurality of subsections, wherein a first subsection of the plurality of subsections temporarily stores the first transactions for the first I/O device which transacts data at the first data rate, wherein a second subsection of the plurality of subsections temporarily stores third transactions for a third I/O device which transacts data at a third data rate, wherein the first and third I/O devices are of like bandwidth requirements and/or of like latency requirements, and wherein the first I/O controller processes each of the plurality of subsection independently.

8. The interface of claim 7, wherein the first and third I/O devices are each one of:
   an audio device, a video device, or a satellite device.

9. The interface of claim 1 further comprises a third I/O controller operably coupled to a third buffer section of the plurality of buffer sections, wherein the third I/O controller controls, at a third data rate, third transactions within the third buffer section for a third I/O device, and wherein the arbitrator activates the gate to coupled a particular line of the third buffer section to the bus.

10. The interface of claim 9, wherein the second I/O controller is operably coupled to a PCI bus, and wherein the third I/O controller is operably coupled to a display.

11. The interface of claim 1, wherein the first I/O device controller further comprises a direct memory access module and a plurality of I/O data controllers.

12. A method for interfacing a bus with input/output (I/O) devices, the method comprises the steps of:
   a) receiving transactions from the I/O devices, wherein each of the transactions is received at a rate corresponding to a providing I/O device of the I/O devices;
   b) for each one of the transactions, identifying a corresponding section in memory for temporarily storing the each one of the transactions, wherein the identifying is based on at least one of: the each one of the transactions and identity of the one of the I/O devices;
   c) for the each one of the transactions, storing the transaction in the identified corresponding section when the identified corresponding section has at least one available entry;
   d) determining when the bus will be available for receiving a selected transaction of the transactions;
   e) arbitrating among the transaction stored in the memory to identify the selected transaction; and
   f) providing, at a rate of the bus, the selected transaction on to the bus.

13. The method of claim 12, wherein step (b) further comprises:
   when the providing I/O devices is a display device, identifying a display memory section of the memory;
   when the providing I/O device is a PCI device, identifying a read PCI memory section of the memory when the corresponding trasactions are read transactions, and identifying a write PCI memory section of the memory when the corresponding transactions are write transactions; and
   when the providing I/O device is a direct memory access device, identifying a direct memory access section of the memory.

14. The method of claim 12, wherein step (c) further comprises:
   updating a status field to not available as the each one of the transactions is being stored, wherein entries of the memory are of a first byte size and the each one of the transactions has a word size that an integer fraction of the first byte size.

15. The method of claim 14 further comprises updating the status field to available for the selected transaction when the selected transactions has been completed.

16. The method of claim 12, wherein step (c) further comprises providing a rejection message to the corresponding I/O device when the identified memory section does not have an available entry.

17. The method of claim 12, wherein step (e) further comprises:
   prioritizing low latency transactions and high data volume transactions over low data volume transactions and latency indifferent transactions; and
   selecting one of the low data volume transactions or one of the latency indifferent transactions every Nth bus available interval to avoid starvation of the low data volume transactions and the latency indifferent transactions.

18. The method of claim 17 further comprises prioritizing read transactions over write transactions.

19. method of claim 12 further comprises, when the selected transaction is a read transaction;
   providing an address of system memory and a read command on to the bus;
   during memory accessible bus interval, receiving, at the bus rate, data from the bus in response to the read command;
   storing the data in an entry of the identified memory section associated with the selected transaction;
   providing, at the rate of the providing I/O device, the data to the providing I/O device of the selected transaction; and
   when the data has been fully provided to the providing I/O device, flagging the entry as available.

20. The method of claim 12 further comprises, when the selected transaction is a write transaction,
  storing, at the rate of the providing I/O device, data into an entry of the identified memory section associated with the selected transaction;
  when the entry is full of the data, setting a status field to full;
  when the status field is set to full, providing, at the bus rate, the data onto the bus; and
  setting the status field to available after providing the data on the bus.

21. An interface between a bus and a plurality of input/output (I/O) devices, the interface comprises:
  a processing module; and
  memory operably coupled to the processing module, wherein the memory includes a plurality of sections for storing transactions and includes operational instructions that cause the processing module to:
    receive transactions from the I/O devices, wherein each of the transactions is received at a rate corresponding to a providing I/O device of the I/O devices;
    for each one of the transactions, identify a corresponding section in memory for temporarily storing the each one of the transactions, wherein the identifying is based on at least one of: the each one of the transactions and identity of the one of the I/O devices;
    for the each one of the transactions, store the transaction in the identified corresponding section when the identified corresponding section has at least one available entry;
    determine when the bus will be available for receiving a selected transaction of the transactions;
    arbitrate among the transactions stored in the memory to identify the selected transaction; and
    provide, at a rate of the bus, the selected transaction on to the bus.

22. The interface of claim 21, wherein the memory further comprises operational instructions that cause the processing module to:
  when the providing I/O devices is a display device, identify a display memory section of the memory;
  when the providing I/O device is a PCI device, identify a read PCI memory section of the memory when the corresponding transactions are read transactions, and identifying a write PCI memory section of the memory when the corresponding transactions are write transactions; and
  when the providing I/O device is a direct memory access device, identify a direct memory access section of the memory.

23. The interface of claim 21, wherein the memory further comprises operational instructions that cause the processing module to:
  updating a status field to not available as the each one of the transactions is being stored, wherein entries of the memory are of a first byte size and the each one of the transactions has a word size that an integer fraction of the first byte size.

24. The interface of claim 23, wherein the memory further comprises operational instructions that cause the processing module to update the status field to available for the selected transaction when the selected transactions has been completed.

25. The interface of claim 21, wherein the memory further comprises operational instructions that cause the processing module to provide a rejection message to the corresponding I/O device when the identified memory section does not have an available entry.

26. The interface of claim 21, wherein the memory further comprises operational instructions that cause the processing module to:
  prioritize low latency transactions and high data volume transactions over low data volume transactions and latency indifferent transactions; and
  select one of the low data volume transactions or one of the latency indifferent transactions every Nth bus available interval to avoid starvation of the low data volume transactions and the latency indifferent transactions.

27. The interface of claim 26, wherein the memory further comprises operational instructions that cause the processing module to prioritize read transactions over write transactions.

28. The interface of claim 21, wherein the memory further comprises operational instructions that cause the processing module to, when the selected transaction is a read transaction;
  provide an address of system memory and a read command on to the bus;
  during memory accessible bus interval, receive, at the bus rate, data from the bus in response to the read command;
  store the data in an entry of the identified memory section associated with the selected transaction;
  provide, at the rate of the providing I/O device, the data to the providing I/O device of the selected transaction; and
  when the data has been fully provided to the providing I/O device, flag the entry as available.

29. The interface of claim 21, wherein the memory further comprises operational instructions that cause the processing module to, when the selected transaction is a write transaction,
  store, at the rate of the providing I/O device, data into an entry of the identified memory section associated with the selected transaction;
  when the entry is full of the data, set a status field to full;
  when the status field is set to full, provide, at the bus rate, the data onto the bus; and
  set the status field to available after providing the data on the bus.

30. A method for interfacing a bus with input/output (I/O) devices, the method comprises the steps of:
  a) monitoring the bus during non-I/O bus intervals for a transaction relating to one of the I/O devices;
  b) interpreting the transaction to identify one of a plurality of I/O controllers that is associated with the one of the I/O device when the transaction is relating to one of the I/O devices, wherein each of the plurality of I/O controllers supports at least a corresponding one of the I/O devices;
  c) determining whether the transaction is a component transaction or a control transaction;
  d) storing, at a bus rate, the transaction in a section of memory associated with the identified I/O controller, wherein when the transaction is the component transaction, storing the component transaction in a data portion of the section of memory;
  e) providing the transaction to the identified I/O controller; and f) processing, by the I/O controller, the transaction at an I/O device rate, wherein when the transaction is the component transaction, providing the transaction to the one of the I/O devices at the rate of the one of the I/O devices.

31. A method for interfacing a bus with input/output (I/O) devices, the method comprises the steps of:
   a) monitoring the bus during non-I/O bus intervals for a transaction relating to one of the I/O devices;
   b) interpreting the transaction to identify one of a plurality of I/O controllers that is associated with the one of the I/O device when the transaction is relating to one of the I/O devices, wherein each of the plurality of I/O controllers supports at least a corresponding one of the I/O devices;
   c) storing, at a bus rate, the transaction in a section of memory associated with the identified I/O controller;
   d) when the transaction is the control transaction, storing the control transaction in a control portion of the section of memory;
   e) providing the transaction to the identified I/O controller; and
   f) processing, by the I/O controller, the transaction at an I/O device rate; and
   g) when the transaction is the control transaction, reconfiguring the identified I/O controller to process component transactions in accordance with the control transaction.

32. An interface between a bus and a plurality of input/output (I/O) devices, the interface comprises:
   a processing module; and
   memory operably coupled to the processing module, wherein the memory includes a plurality of sections for storing transactions and includes operational instructions that cause the processing module to:
      monitor the bus during non-I/O bus intervals for a transaction relating to one of the I/O devices;
      interpret the transaction to identify one of a plurality of I/O controllers that is associated with the one of the I/O device when the transaction is relating to one of the I/O devices, wherein each of the plurality of I/O controllers supports at least a corresponding one of the I/O devices;
      determine whether the transaction is a component transaction or a control transaction;
      store, at a bus rate, the transaction in a section of memory associated with the identified I/O controller, wherein when the transaction is the component transaction, store the component transaction in a data portion of the section of memory;
      provide the transaction to the identified I/O controller;
      process, by the I/O controller, the transaction at an I/O device rate; and
      when the transaction is the component transaction, provide the transaction to the one of the I/O devices at the rate of the one of the I/O devices.

33. An interface between a bus and a plurality of input/output (I/O) devices, the interface comprises:
   a processing module; and
   memory operably coupled to the processing module, wherein the memory includes a plurality of sections for storing transactions and includes operational instructions that cause the processing module to:
      monitor the bus during non-I/O bus intervals for a transaction relating to one of the I/O devices;
      interpret the transaction to identify one of a plurality of I/O controllers that is associated with the one of the I/O device when the transaction is relating to one of the I/O devices, wherein each of the plurality of I/O controllers supports at least a corresponding one of the I/O devices;
      store, at a bus rate, the transaction in a section of memory associated with the identified I/O controller;
      when the transaction is a control transaction, store the control transaction in a control portion of the section of memory;
      provide the transaction to the identified I/O controller; and
      process, by the I/O controller, the transaction at an I/O device rate; and
      when the transaction is a control transaction, reconfigure the identified I/O controller to process component transactions in accordance with the control transaction.

* * * * *